(12) United States Patent
Kern

(10) Patent No.: US 7,780,013 B1
(45) Date of Patent: Aug. 24, 2010

(54) FIRE DEPARTMENT CONNECTION WITH DEBRIS FILTER

(76) Inventor: Karl Kern, 2695 Rustic Oak Ct., Rocklin, CA (US) 95677

( * ) Notice: Subject to any disclaimer, the term of this patent is extended or adjusted under 35 U.S.C. 154(b) by 0 days.

(21) Appl. No.: 11/213,297

(22) Filed: Aug. 29, 2005

(51) Int. Cl.
  B01D 35/02 (2006.01)
  E03B 7/07 (2006.01)
  B05B 1/14 (2006.01)

(52) U.S. Cl. .......... 210/435; 210/446; 210/447; 137/272; 137/550; 239/548

(58) Field of Classification Search .......... None
  See application file for complete search history.

(56) References Cited

U.S. PATENT DOCUMENTS

| | | | | |
|---|---|---|---|---|
| 543,922 | A * | 8/1895 | Buckley | 210/447 |
| 1,817,376 | A * | 8/1931 | Izquierdo | 210/447 |
| 2,697,522 | A * | 12/1954 | Booth | 210/447 |
| 3,369,669 | A * | 2/1968 | Loftin | 210/411 |
| 3,556,298 | A * | 1/1971 | Huebner et al. | 210/447 |
| 4,045,351 | A * | 8/1977 | Peterson | 210/446 |
| 4,056,474 | A * | 11/1977 | Snouffer | 210/446 |
| 4,340,470 | A * | 7/1982 | Van Mol | 210/447 |
| 4,376,053 | A * | 3/1983 | Bullock et al. | 210/447 |
| 4,460,469 | A * | 7/1984 | Francesconi, Jr. | 210/447 |
| 4,472,274 | A * | 9/1984 | Williams | 210/447 |
| 4,609,459 | A * | 9/1986 | Hendrix | 210/445 |
| 5,826,803 | A * | 10/1998 | Cooper | 239/556 |
| 5,882,508 | A * | 3/1999 | St-Jacques | 210/447 |
| 5,944,991 | A * | 8/1999 | Shellenbarger et al. | 210/445 |
| 5,985,158 | A * | 11/1999 | Tiderington | 210/447 |
| 6,149,703 | A * | 11/2000 | Parker | 210/435 |
| 6,153,095 | A * | 11/2000 | Francisco | 210/445 |
| 6,162,354 | A * | 12/2000 | Yang et al. | 210/447 |
| 6,173,739 | B1 * | 1/2001 | Addo et al. | 137/550 |

* cited by examiner

Primary Examiner—Duane Smith
Assistant Examiner—Madeline Gonzalez
(74) Attorney, Agent, or Firm—Craig A. Simmermon

(57) ABSTRACT

An improved fire department connection (FDC) having an accessible debris filter box interposed vertically in the line to permit the removal of undesired introduced solids to prevent the solids from clogging the sprinkler system which is in fluid communication with the base of the FDC. The box has a permanent filter, or removable filter media or a combination of the two types of filters, all accessible via a front removable plate thereon. The debris filter box may also be interposed vertically in other fluid flow systems that are subject to the introduction of undesired solids.

6 Claims, 7 Drawing Sheets

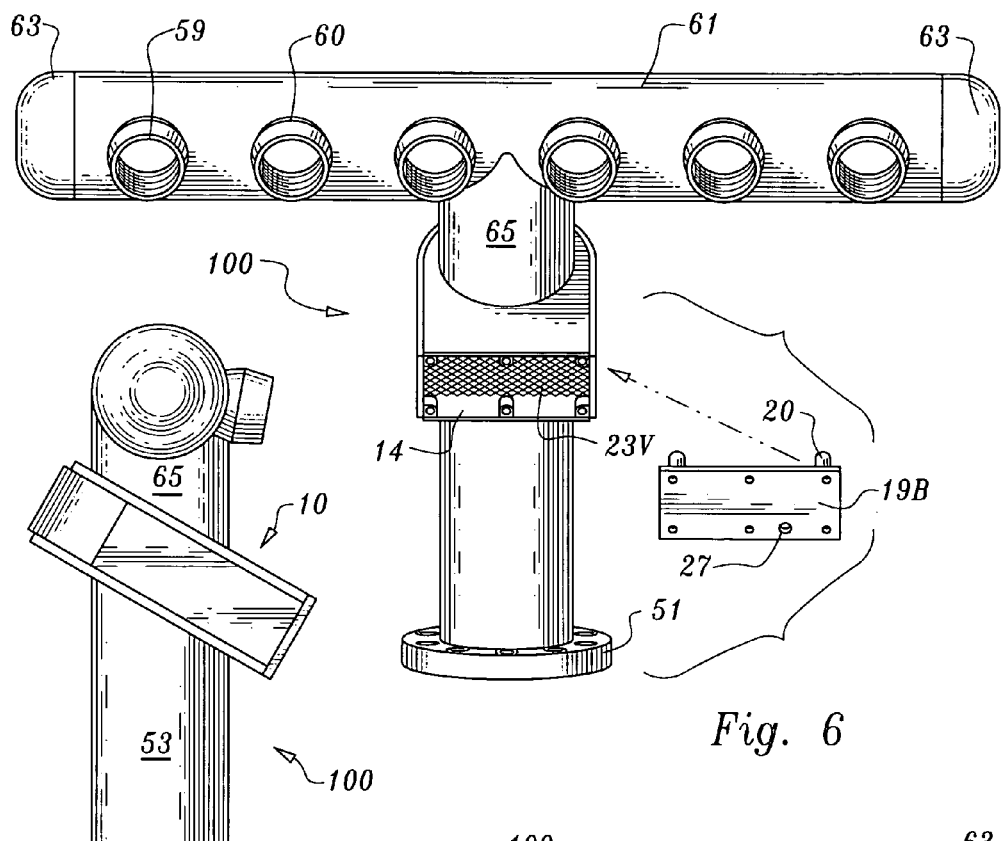
Fig. 5
Fig. 6
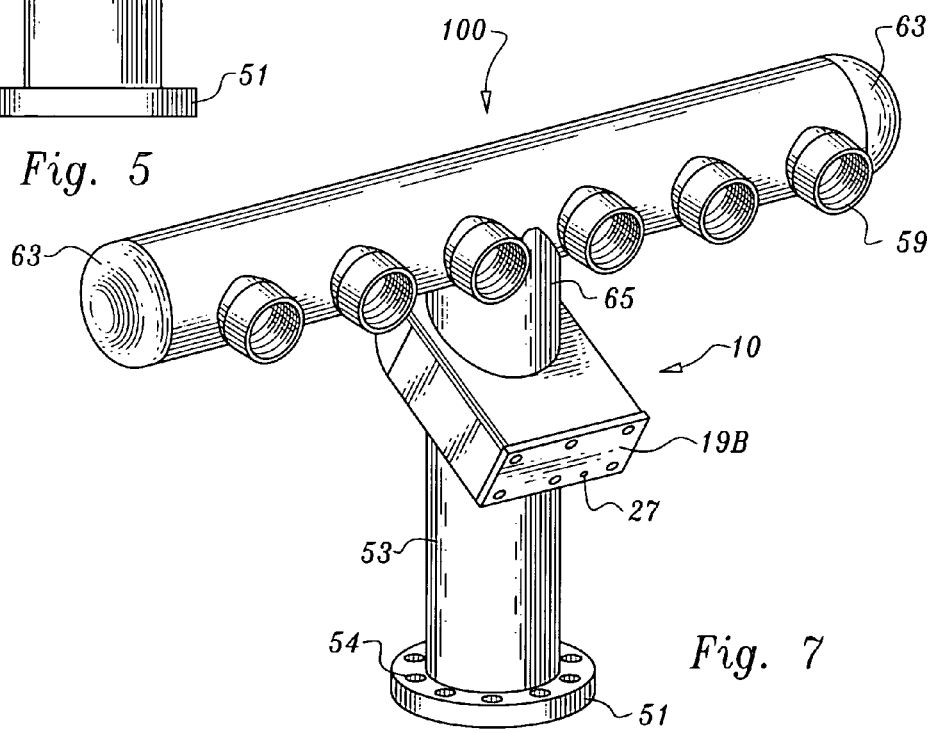
Fig. 7

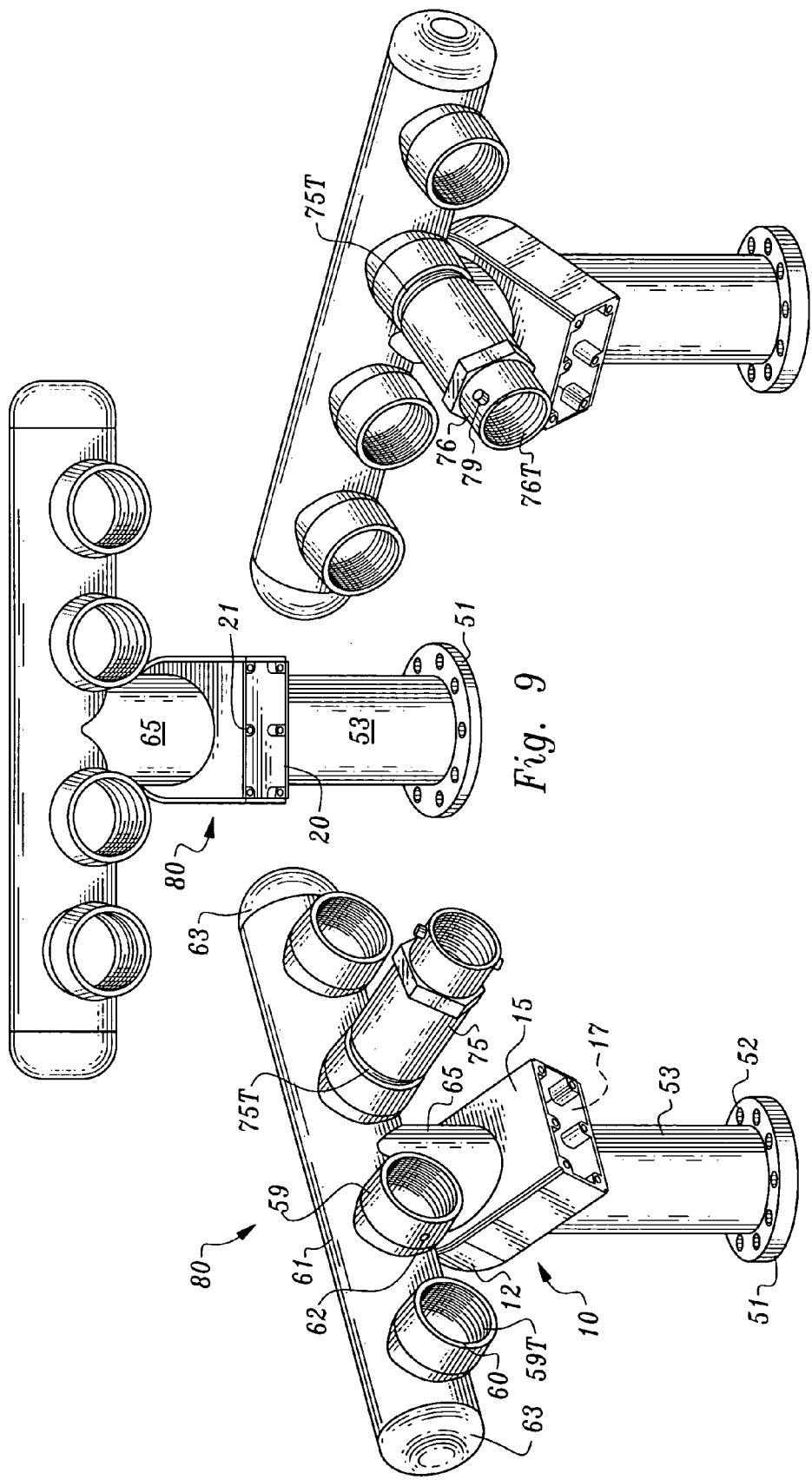

FIRE DEPARTMENT CONNECTION WITH DEBRIS FILTER

FIELD OF THE INVENTION

This invention pertains to a modified Fire Department Connection, and the debris filter that are integrated into the Fire Department Connection to form the modified product of this invention.

BACKGROUND OF THE INVENTION

Fire department connections (FDC) are found everywhere that not only commercial and industrial buildings are found, but also at locations of multi-occupant residential units as well. Indeed, in some areas where there may not be a fire hydrant within a predetermined distance from a single family dwelling, an FDC may be required outside of the residence by local officials.

A sprinkler system is an array of descending sized interconnected pipes with water therein under pressure. This pressurized water is released upon the occurrence of high heat from the fire, because the sprinkler head seals melt away as is known in the art. In order to replenish sprinkler system water, and maintain the pressure, fire trucks come to a fire scene and connect to the FDC as well as to a local hydrant. Water used to fight fires is moved from a source, such as a fire hydrant, to one or more fire trucks, from which the water is pumped to the FDC and from the FDC to the sprinkler system for the building. Next time you visit a local mall or a "Big Box Store" there will be one or more FDCs nearby for use in case of fire.

The input source of water for the FDC is usually a municipal water source or a tanker truck. But due to the nature of the construction and operation of the FDC, water is not under pressure therein until water is pumped into it. Compare this to a fire hydrant, which upon opening will flood the immediate area with flowing water due to the pressurization. Thus, opening of the port of an FDC does not bring forth water. Because of this lack of pressurization of the FDC, the ports can be accessed without too much effort, vandalism—both destructive and nondestructive—can and does occur. Children and vandal adults often try to put stones, sticks, newspaper and other debris into the port(s) of an FDC.

Since the presence of these undesired items can cause blockage of fluid flow, when water is pumped from the fire truck, it is important to try to prevent items from clogging the throat of the port(s) and thereby impeding water flow.

Applicant who has a long history of involvement with FDCs, sprinklers, and fire protection cogitated on the issue at hand. Finally, applicant created a filter system that can be integrated into the FDC to prevent retardation of fluid flow by thwarting debris from entering the FDC's down tube that leads to the sprinkler system. This is accomplished by having the debris fall forward out of the direct line of fluid flow, coupled with the use of filter media, both fixed and removable, undesirables as small as ⅛ inch can be prevented from clogging sprinkler system fluid lines. FDC units vary in two ways: First, the number of ports; and second the size of diameter of the down pipe, which feeds from the ports. The down pipe which is the pipe below the debris filter box usually varies from four to ten inches in diameter. Actual size will depend upon geographical location and type of facility where the FDC is located.

FDCs, as noted, vary with the number of ports. The least is two and the maximum is generally six or eight. Various permutations of pipe diameter and port number are found in the field. Thus a 4-inch pipe in one location can have two ports, but in a different location where fire is a greater hazard, such as a dry-cleaning plant, the same pipe could have three or four ports attached thereto. The size and nature of the building use influences such as a fire marshal's decision for the configuration of an FDC.

In all instances, interior access is achieved by either threaded bolt or by friction fit connectors which are press fit into position and of course can be removed by the application of leverage. As noted above, water flows from the source, a tanker or hydrant, to the fire truck to the FDC, and out the FDC to the sprinkler system of the building. It is also to be noted that unlike a hydrant, which has an easy access rotatable valve such that after rotation, upon removal of the cap, a lot of water is wasted out onto the street. The FDC, while under pressure, has a one-way clapper therein to prevent fluid loss upon accession.

The invention accordingly comprises the device possessing the features, properties, the selection of components which are amplified in the following detailed disclosure, and the scope of the application of which will be indicated in the appended claims.

For a fuller understanding of the nature and objects of the invention, reference should be made to the following detailed description, taken in conjunction with the accompanying drawings.

BRIEF SUMMARY OF THE INVENTION

A modified FDC having a debris filter device built into the FDC to prevent blockage of the building sprinkler system connected thereto. The FDC has any of the choices of (1) only a permanent filter media disposed within the filter box, (2) only a removable filter media, (3) a combination of both types of which media, any of which choices can be readily accessed for waste removal.

It is a first object to provide an improved FDC, which is not subject to blockage.

It is a second object to provide an FDC having a filter box thereon with a filter media therein.

It is a third object to provide a debris filter box having either a fixed or permanent filter media or both media therein to prevent blockage of the down pipe of the FDC.

It is a fourth object to provide a filter box for an FDC, which is easily accessed for cleaning and debris removal, without affecting the pressurized sprinkler system.

It is a fifth object to provide a debris catching filter box in an FDC which can be cleaned out without having to shut down the sprinkler system to which the FDC is attached.

Other objects of the invention will in part be obvious and will in part appear hereinafter.

BRIEF DESCRIPTION OF FIGURES

FIG. 5 is a left side elevational view of a multiple port FDC.

FIG. 6 is a top perspective view of a 6-port FDC having a variant filter media and an alternate front plate.

FIG. 7 is a left side perspective view of the apparatus of FIG. 6.

FIG. 8 is a bottom front perspective view of a 4-port apparatus of this invention with one snoot thereon.

FIG. 9 is a top perspective view of the apparatus of FIG. 7.

FIG. 10 is a right perspective view of the apparatus of FIG. 7.

DESCRIPTION OF THE PREFERRED EMBODIMENT

Figure 1:
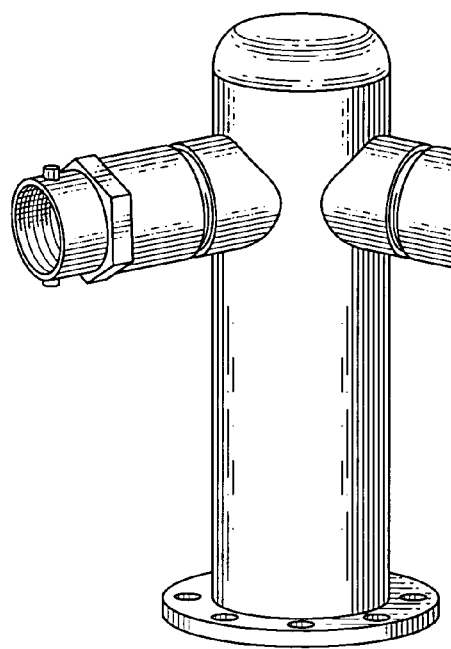
FIG. 1 is front elevational view of a PRIOR ART 2-port fire department connection.

FIG. 1 is a typical 2-port FDC made by several companies found at or near many commercial sprinklered buildings in the USA and Canada. It usually has a four or 6-inch down pipe beneath the two ports and no separate manifold.

Figure 2:
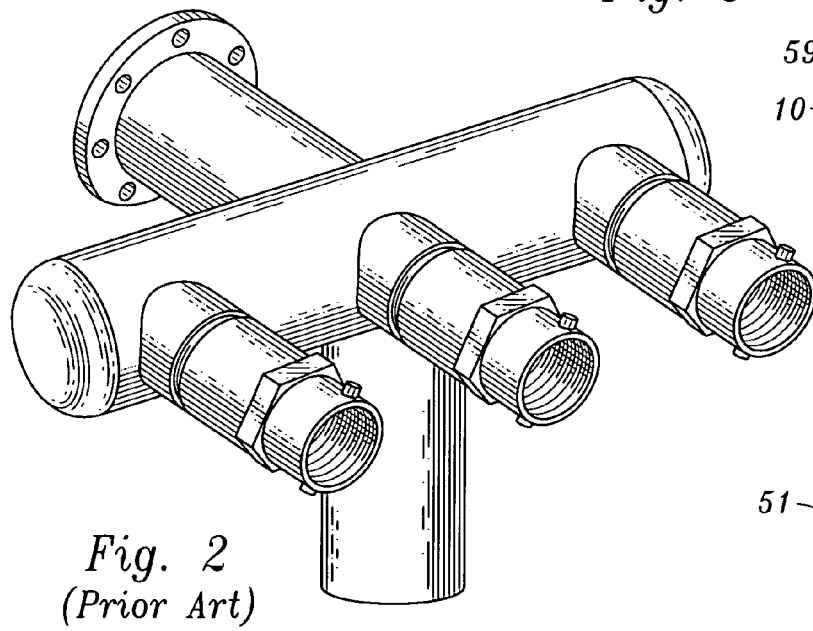
FIG. 2 is a top perspective view of a PRIOR ART 3-port wall mount fire department connection.

FIG. 2 is a perspective view of another typical vertical mount prior art FDC made by applicant's company and others in the industry.

Figure 3:
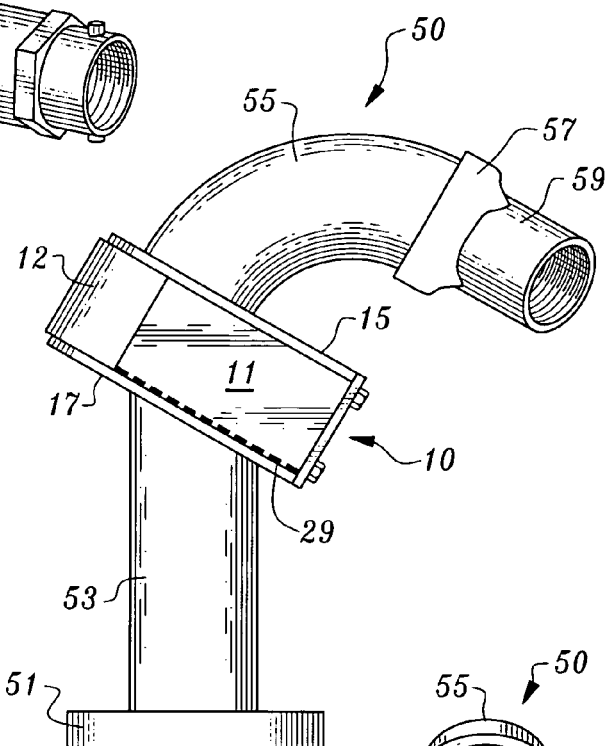
FIG. 3 is a left side elevational view of a 2-port fire department connection with the device of this invention incorporated therein.
Figure 4:
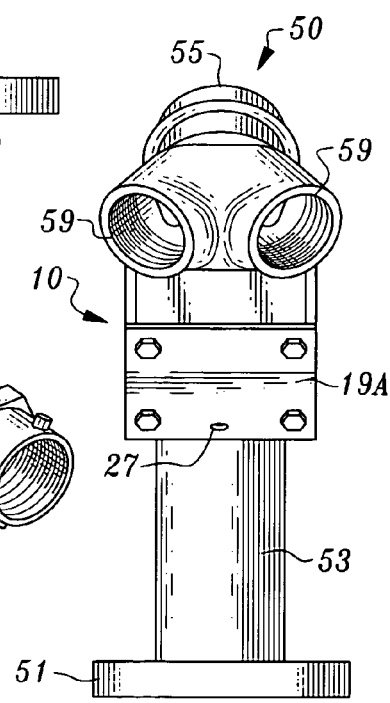
FIG. 4 is a front elevational view thereof.

FIGS. 3 and 4 show a typical modified FDC according to this invention. Since the invention herein consists of a combination and sub-combination, namely, the modified FDC which includes the debris box and the debris box itself, a discussion of the FDC and the parts thereof is in order prior to discussing the details of the sub-combination.

Here a typical modified 2-port FDC 50 is seen in a left side plan view and a front elevational view. The right side plan view would be a minor image of FIG. 3. Thus an annular base 51 that rests on the ground and is fluidly attached to the commencement of an unseen sprinkler system is seen. Disposed in the opening of the annulus is a down tube 53 which in turn is connected to the underside of the debris box to the interior of the debris box 10, while not seen here, contains a filter medium. The topside of the debris box is fluidly connected to a radius tube 55 at the lower end of the radius tube. The other end or distal end of the radius tube is connected to a port housing 57 which includes two conventional fire hose connection ports 59. All connections are welded unless otherwise indicated. While the annular base 51 is depicted throughout this application, it is indeed optional to the user to have this base. Other mount means, some of which may be threaded, perhaps with an intervening nipple or collar may be employed to retain the FDC in place.

The exterior of the debris box is seen as noted disposed between the down tube and the radius tube, at an angle of about thirty degrees. It may be set at a smaller or greater angle within the range of fifteen to about forty-five degrees for convenient access. Thirty degrees is ideal for assembly and access to the filter media as well as for junk removal.

The debris box 10 has a pair of spaced sidewalls 11, an arcuate rear wall a top wall 15 and a bottom wall 17. The device includes a front opening for access and is closed off by a removable front cover plate such as 19A shown in FIG. 4. Other suitable front plates will be discussed infra.

Figure 19:
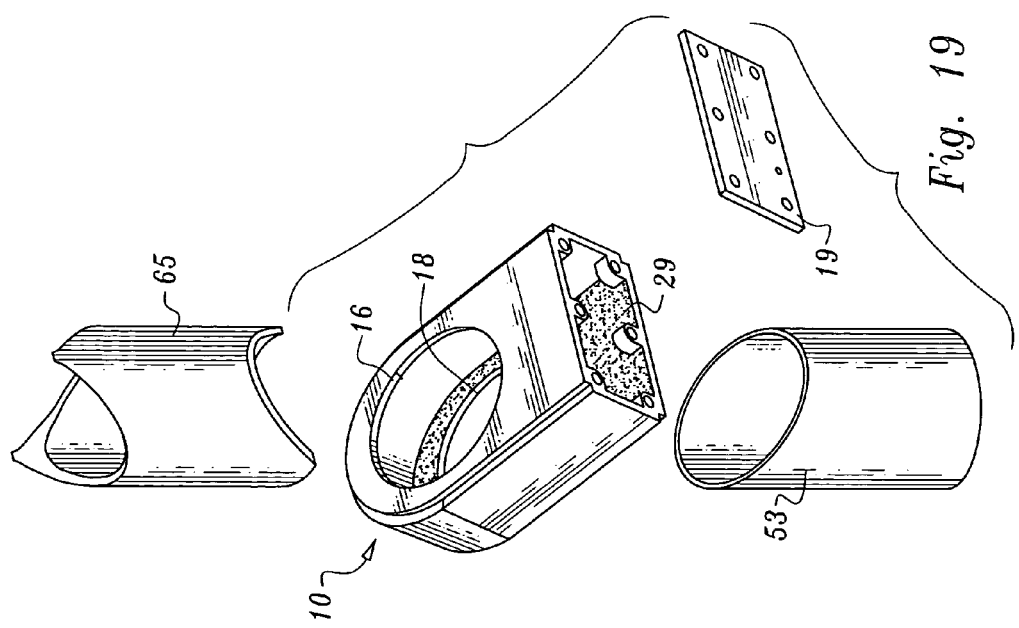
FIG. 19 is an exploded view of the debris box and the two tubes that connect thereto, but without the filter media.

Seen in FIG. 3, and also shown with a jagged edge in FIG. 19 is the location where an optional corrosion inhibition coating 29 per FIG. 3, is present. Suitable coatings that would cover the interior of the debris box, other than the filter media, and which is can be used on the down tube 53 include clear or colored epoxy resins among others.

FIG. 5 is a left side elevational view of a multiple port FDC. This view could be the side view of a 6-port unit such as seen in FIGS. 6&7 or of a 4-port unit as shown in FIG. 8.

Typically multiple port FDC's have a maximum of from six to eight ports rarely more; so modified ones would generally fall within the same port number range. While 3-port units are known, higher number port units more than three ports usually are of an even number.

In FIG. 5, FDC 100 is seen. It is also seen in FIGS. 6 and 7. It has a base 51 connected to a down tube 53, which in turn is in fluid communication with debris box 10, which in turn is connected to a connector tube 65, which is generally vertically disposed. This connector tube is in fluid communication with a manifold 61 having end caps 63 on opposite ends. A series of bores—here 60—are evenly spaced on opposite sides of the connector tube 65. At each respective opening 60 in the manifold there is a port 59. Reference is also made to FIG. 19 and the text pertaining thereto infra.

As with the previously described 2-port FDC, all fluid joints are welded together unless otherwise indicated. Disposed inside the front opening 14, seen in FIG. 6, is a removable mesh filter 23V. More discussion will follow infra in connection with FIG. 13 on the filter mesh 23V and the other fixed configuration of mesh 23, disposed inside the debris box 10. A removable front cover plate 19B, having a 6-bolt pattern and which plate has a pair of spaced legs 20 that fit inside the opening 14, is seen. More on front cover plate 19B will be recited in connection with FIG. 17. Suffice it to say however, that no matter the configuration of the cover plate utilized, a small, such as ⅛-inch diameter drain hole should be present such as aperture 27 seen both in FIGS. 6 & 7.

In FIG. 7, the front cover plate 19B with the 6-bolt pattern is seen attached in place over the opening 14. While shown to be a generally vertical, relatively short tube 65 the connector tube could be elongated and arcuate. All that is required is that elevations of the manifold not exceed thirty-six inches as is required by fire marshal regulations of many states including California. From the angle of the view, the bores 54 in the base for conventional mounting bolts are also seen.

The reader is now directed to FIGS. 8-12, and 19. FIGS. 8-12 all depict different views of a 4-port FDC 80 having a debris box integrated therein. It is to be noted that like numbers refer to like parts described with respect to other embodiments of the FDC, all of which use the same debris box.

Thus, annular base 51 of the 4-port unit 80 is seen to have a plurality of spaced optionally threaded bores for the receipt of bolts not shown. These bolt holes are designated 52. Down tube 53 threads into or is welded to the base for a non leak fluid communication downwardly from the debris box 10; which has an opening on the underside thereof to which the second or upper end of the down tube is attached in fluid communication. This box is similar to the one previously described in that it has two openings, one on the top wall 15 and one on the bottom wall 17 which bottom wall opening is not seen in this figure. The box 10 has spaced sidewalls and an arcuate rear wall 12. The front opening is again designated 14.

A connector tube 65 is fluidly connected from the debris box 10 to the manifold 61, which manifold is similar to the one previously described, but laterally narrower as only four ports are installed. The manifold which is closed off on opposite ends by end caps 63 welded into position, includes four bores 60 into which the four ports 59 are each preferably welded into place to present a leakproof connection in their respective bore 60.

In accordance with California law, and perhaps other states as well but unbeknownst to applicant, and as seen in FIGS. 8&10, a threaded snoot 75 available in the marketplace from Placer Waterworks, Inc., among other vendors, is threadedly engaged by male threads 75T into one of the ports. That is, the snoot 75 is interposed between the fire truck hose and the FDC when the connection is made.

As can be anticipated in today's society, if a part can be stolen, it will be. Since the snoot 75 is threaded into position, applicant has taken a step which optionally can be employed to prevent the theft of the snoot. Thus in FIG. 8, there is seen a threaded bore 62, which is for the receipt of a not seen set screw, which threads into and impacts the snoot to help retain the snoot in place, by making it extremely difficult for a vandal to quickly unthread the snoot. Since snoots are believed to be used only in California, this retention bore 62 is optional.

A point of information needs now to be made. All of the FDCs shown in the figures, are seen to be threaded at their respective ports. 59. See FIG. 8 wherein the threads 59T is seen in the port 59 of the FDC. As mentioned supra, an FDC, is usually made of steel or cast iron, though other materials may be employed. The threading of thread 59T is a national pipe thread. But the fire departments of the United States all use hoses with brass connections. The threads on the hoses are National Fire Department threads, a different thread from that seen in FIG. 8 and elsewhere herein. Thus it is necessary to first insert a brass fitting configured like a nipple that is national pipe thread on one end and national fire thread on the other end. In order to be able to attach a fire hose to an FDC, when snoots are not employed, this fitting must be brass, as fire departments will only connect their hoses to brass fittings. Since these nipples are conventional in the art, and resemble a snoot, but for the clapper disposed internally in the snoot, such a nipple is not depicted in the figures.

Figures 11, 12:
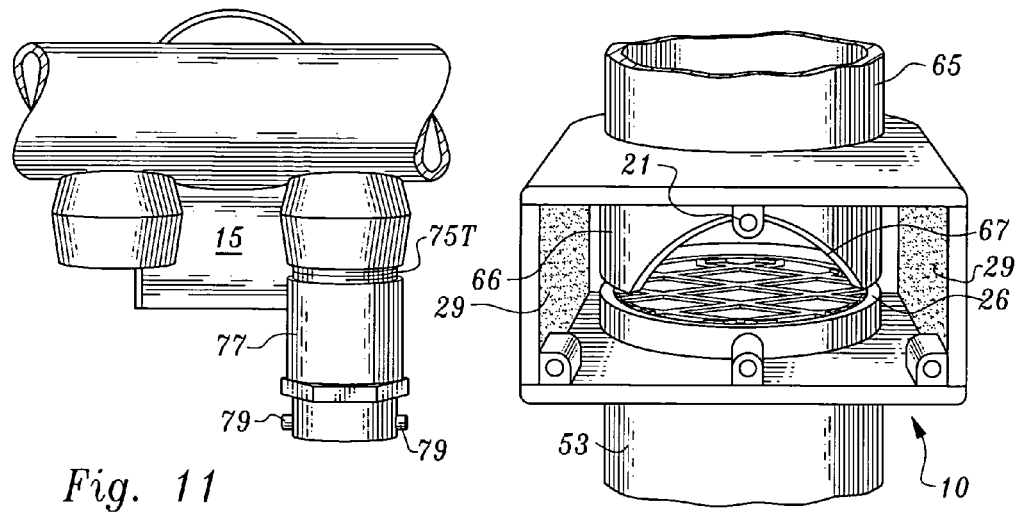
FIG. 11 is a partial top plan view of this apparatus.
FIG. 12 is a front close-up view of the debris guard forming part of the subject matter of this application.

In FIG. 9, a top close-up perspective view of FDC 80, one version of the bolt-hole pattern is seen for the removable front plate that closes off the debris box. Note specifically threaded lug 21, four of which are seen. Six such lugs are also contemplated with extras being at the top corners In FIG. 10, a female threaded collar 76 is disposed at the front-end of the snoot, which collar is internally or female threaded for easy direct connection of a fire hose, without a nozzle on it. Collar 76 and its internal threads 76T is seen. In FIG. 11, the top wall 15 of the debris box is seen, as are the two rod-ettes or little rods, 79 used for attaching a fire department hose to the collar 77 of the snoot.

The discussion of FIG. 12 gives the writer the opportunity to discuss the down tube and the connector tube sizes. As seen here both tubes are of the same diameter, which can vary from four to about eight inches in interior diameter. In order not to impede fluid flow, both tubes should have the same diameter. Note from this figure the use of a 4-lug bolt pattern for securing the front plate into position. While this configuration has three lugs at the bottom and one central upper one, a 4-corner lug bolt pattern is also contemplated. Note also that wide cover plates are attached with six bolts. The cover plate is not seen in this view.

The mesh screen 23 which can vary from 0.5 inch openings to 1.50 inch opening is seen disposed within the lower tube, the down tube. Reference should now be made to the diagrammatic figure, FIG. 13. A clearly defined slit or spacing is seen between the connect tube and the down tube. There is a good reason for this as can be gleaned from FIG. 13. If a circular mesh segment 23 is to be used, it is welded into place prior to assembly of the debris box to the tube 53 and thus fixedly secured into the receiver section 22 of tube 53 that projects through the thickness of the bottom wall of the debris box. See also FIG. 13. The section 66 of connector pipe 65 that protrudes down into the debris box includes an arched cutaway 67 to permit hand access for removing debris from the filter medium 23. If however the specification calls for only a removable filter medium, then a toast shaped grid 23V, with V being for variant is placed into the slot (gap) 26, full width of the box interior. Again see FIG. 13. It is important to understand that the fixed in place filter media are for segregation of large items, due to the ½ to 1½-inch spacing in the media. Contrast this with the ⅛ to ¼-inch openings of the removable media 23V, which will separate out small items such as gravel pieces. While it has been indicated that either a fixed filter media 23 or removable media 23V may be employed, it is more probable that if a choice is to be made only a fixed filter will be utilized. The preferred mode however is to use the two in combination, because the fixed piece being welded in place, can help support the removable unit to offset the possibility of the removable unit becoming warped due to be subjected to high pressure flows. In applicant's mind, one can never be too careful when it comes to maintaining the integrity of a building sprinkler system. Therefore, while in FIG. 13 and elsewhere herein, it is stated as an alternative to use a fixed filter media 23 welded in place to the down tube, OR a removable media, as designated 23V, the PREFERRED mode is to employ both a fixed and a removable filter. This provides double protection as the removable filter overlies the fixed filter.

Figure 13:
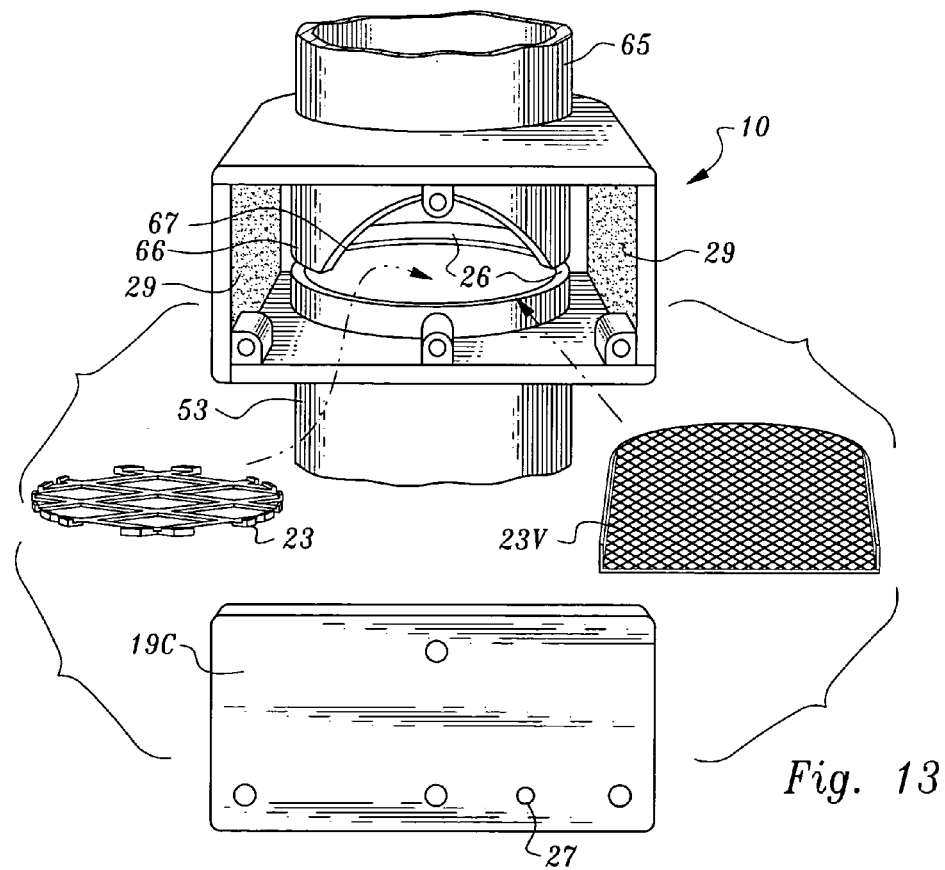
FIG. 13 is a variant configuration of the front of the debris guard of this apparatus.
Figure 14:
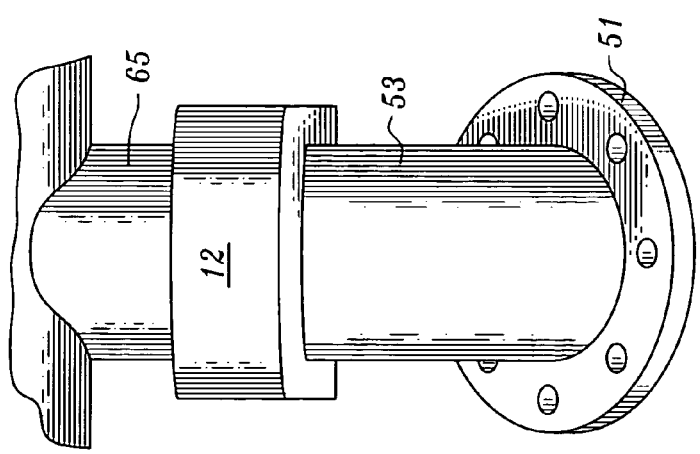
FIG. 14 is a partial rear top perspective view of the debris guard.

In FIG. 13, a 6-bolt pattern is seen and as such front cover plate 19 having six bolt holes is seen. Note also the presence of the corrosion inhibitor coating 29 on the box sidewalls. Note also the configuration of filter media 23V which has upturned side edges In FIG. 14, the rear of a manifold bearing FDC is seen, with the same size connector tube 65 and down tube 53. Here the curvature of the rear wall 12 is seen. The reason(s) that the debris box has a curved or arcuate rear wall is to aid in fluid flow and to reduce the swirling turbulence that might arise if a pair of hard 90 degree corners were present at the interface of the side walls and rear wall.

Figure 15:
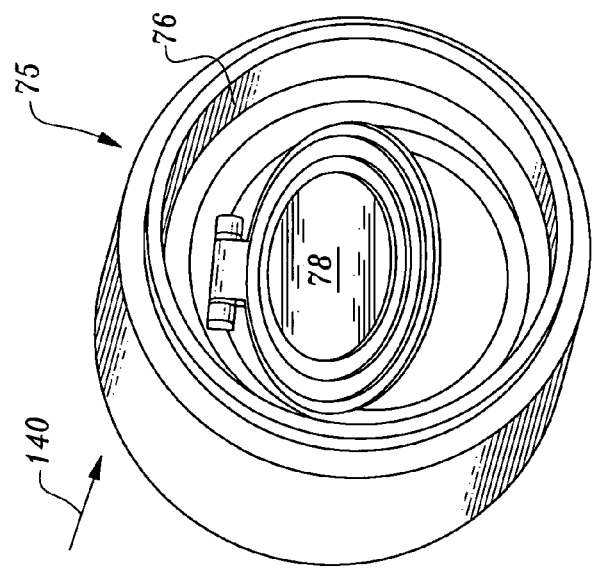
FIG. 15 is a front view of a snoot with clapper used as an accessory on an FDC, but forming no part of this invention.

In FIG. 15, the interior of a PRIOR ART snoot 75 is seen. This view is from the rear of the snoot, as the one way clapper valve 78 that the snoot carries, moves toward the viewer. The snoot 75 serves to prevent leakage of the FDC should the number of hoses from the fire truck connected to the FDC be less than the number of ports (with snoots) available for connection. The snoot is a commercial item and forms no part of this invention.

Figure 16:
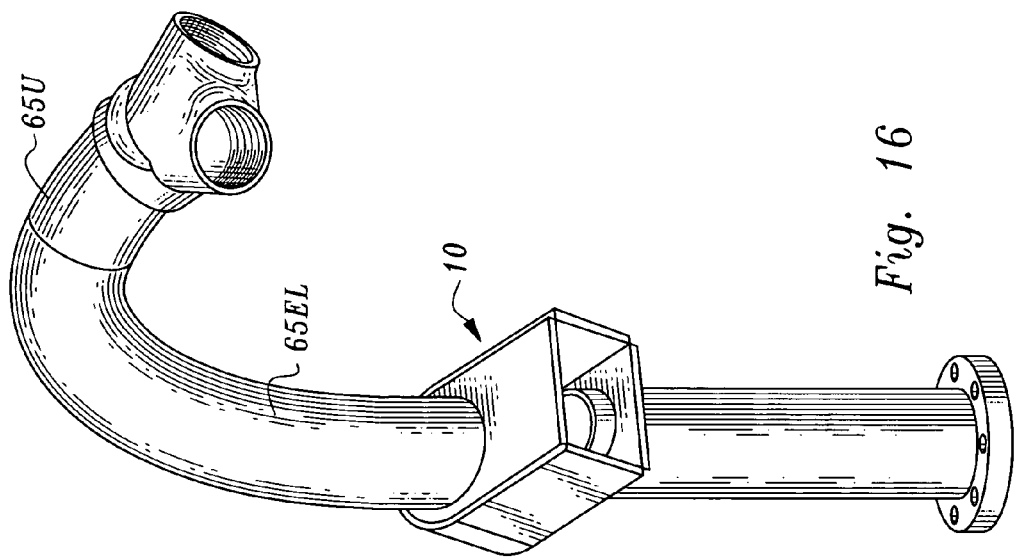
FIG. 16 is a front perspective view of a variant 2-port apparatus according to this invention.

FIG. 16 depicts a 2-port FDC similar to the one shown in FIG. 3. However the connector tube 65 is of an extended length and is here designated 65EL. Otherwise, all aspects of the FDC and the debris box therein are the same. From a construction point of view, connection pipe 65EL may be one piece from the dual port snoot, all the way to the box 10 such as is shown in this FIGURE. In other instances however, it may be easier for fabrication purposes, to employ a separate chamber filter sleeve within the box that would thread to the chamber's upper plate, as would the connector tube. The sleeve aforementioned would have the same appearance as the lower end of the connector tube. When assembled, the viewer would not be able to discern whether a one component or 2 component construction had been utilized.

Figure 17:
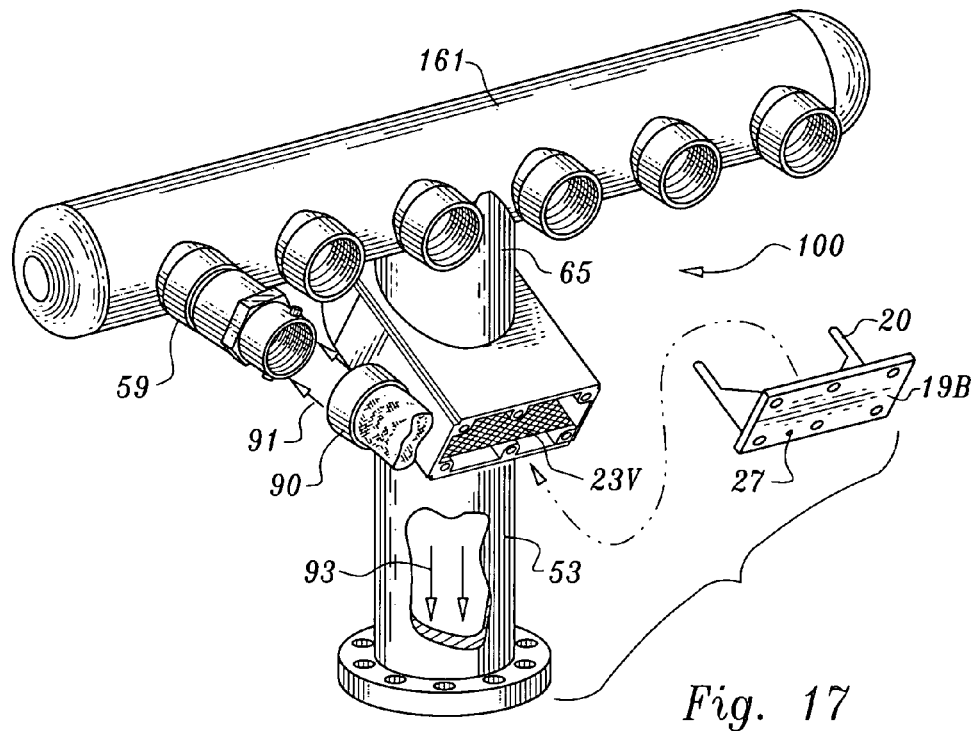
FIG. 17 is a partial exploded view showing the cover plate used to secure the debris guard of this invention.

In FIG. 17, a 6-port FDC 100 is seen. Here the variant mesh filter 23V having the toast shape, has a mesh size of about ⅛-inch. The filter 23V, which preferably has rolled side edges for shape integrity is shown disposed across the entire width of the interior of the debris box. The front cover plate 19B is used. This version has a pair of spaced legs 20 that are disposed normal to the plate itself to prevent the grid 23V from possibly wobbling or chattering while disposed in the slot 26. In the cutaway section of the down tube 53 two arrows designated 93 indicate the direction of the fluid flow downwardly to the underground connection to the sprinkler system of the building in question. Hose 90 from the fire truck which will connect to one of the ports has two arrows 91 which show the direction of the water flow into the FDC. Thus the water once in the manifold passes downwardly through tube 65 through the filter media 23 and/or 23V, as may be present to the down tube 53.

Figure 18:
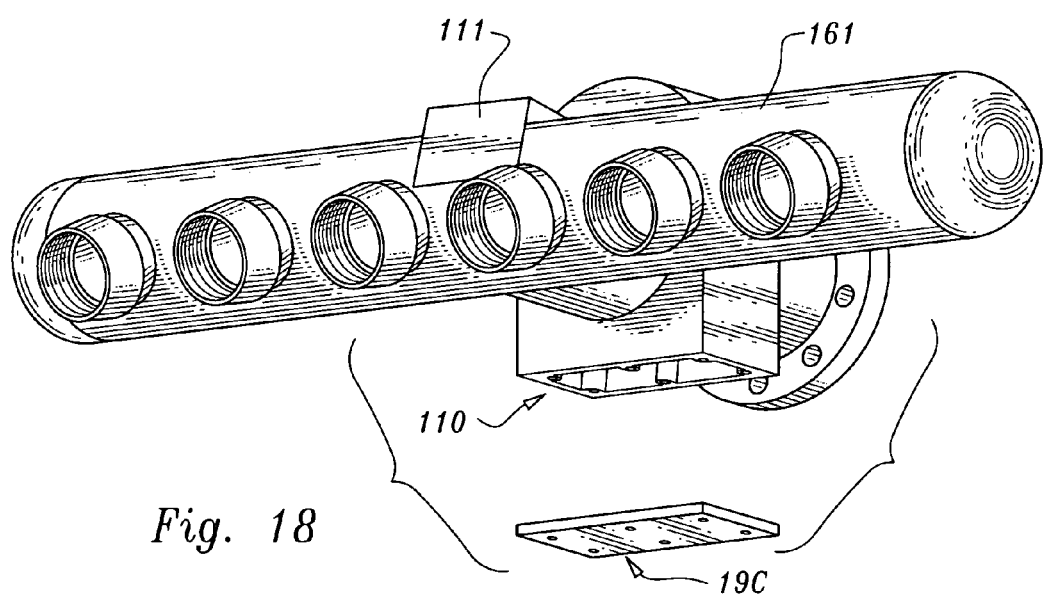
FIG. 18 is a right perspective view of a wall mount FDC that incorporates the debris guard of this invention.

FIG. 18 depicts a variant of a 6-port FDC, designated 110. This unit is to be vertically mounted as is sometimes done for fire protection in certain jurisdictions. However, here too, the debris filter box 10 is of the same configuration. Here a 4-bolt pattern for closure is used and thus front cover plate 19C having such a pattern is shown. Of course the bolt-hole pattern is one of choice and does not form a critical aspect of the debris filter box.

FIG. 19, illustrates an exploded view of the debris box 10. Here the two openings 16 for tube 65 and opening 18 for tube 53 are seen. The front plate is purposely not numbered as any of the three variants may be employed, as research has found that the two legs 20 seen in FIG. 17 are helpful but not required, and are usually employed with the horizontally wider debris boxes for structural integrity.

Figure 20:
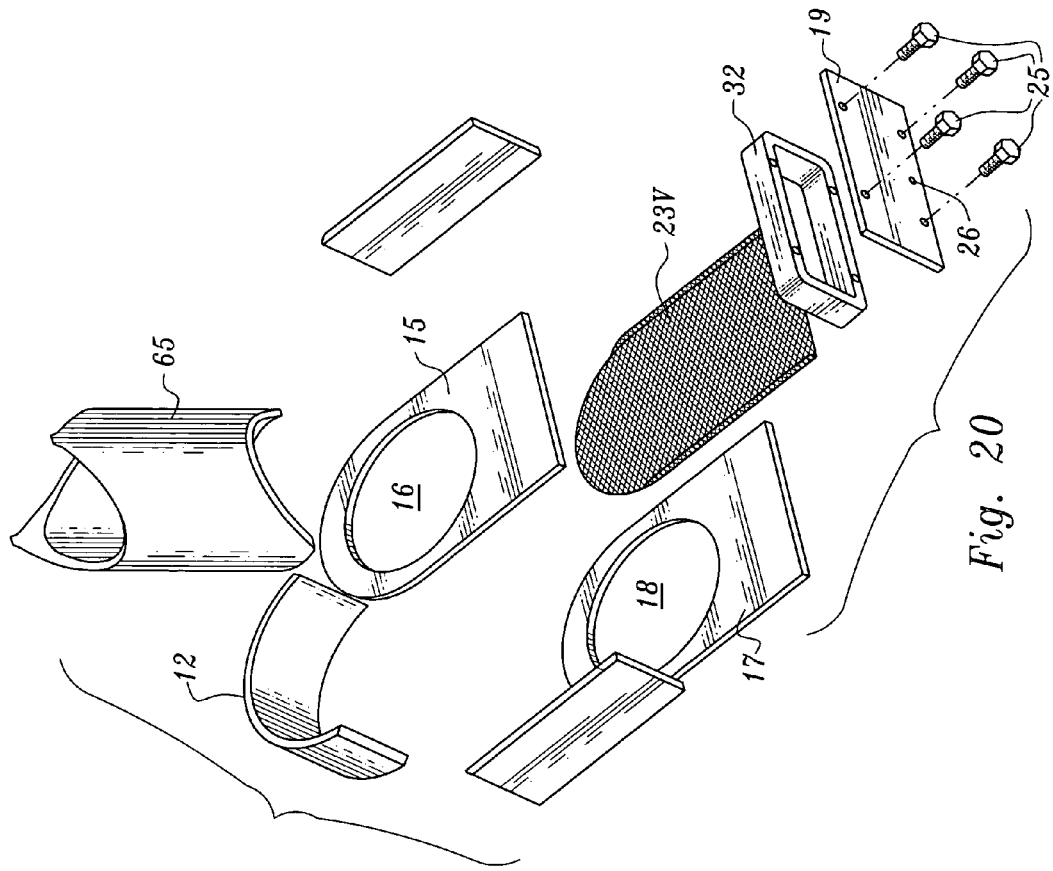
FIG. 20 is a diagrammatic exploded view of an alternate assembly mode.

FIG. 20 illustrates an alternate assembly mode preferred by applicant. The discussion previously has related to an open front debris filter box, with four or six tapped lugs for receipt of the bolts that pass through the front cover. Here however instead of using a plurality of precast or welded in place tapped lugs, which may or may not 100% align with the bores of the front cover plate, due to human error in the welding process, a faceplate anchor 32 with threaded apertures to receive the, preferably penta-head, bolts 25 used to retain the front cover plate. The anchor is welded into position during the course of assembly. It is to be noted that the down tube 53 is not seen in this view and therefore since the round screen 23 is welded to the top edge thereof, it too is not seen in this exploded view.

It is seen that I have devised an improved FDC, by providing an accessible debris filter. As is known, children and vandals often pry off or otherwise gain access to FDCs and throw rocks, fruit pits, sticks, tennis balls, and other debris into the ports of the FDCs. They never think of the dire consequences that could result if the sprinkler system becomes clogged and fails to operate as intended. The debris filter box prevents potential tragedies—both big and little—from happening. The debris filter box is easily accessible as needed, and access can be limited by using unique screws or bolts such as penta-head bolts, made of stainless steel.

As to the box, per se, it is contemplated that most usage will be part of the original equipment replacements or new FDCs. While possible to retrofit existing FDCs with the debris filter box of this invention, in many instances, it may be cost prohibitive to do so. In any case; however, when retrofit is an option, it will be necessary to reduce the elevation of one of the two tubes to remain within the constraint of many states that the FDC may not be higher than thirty-six inches from ground level.

Any suitable material currently used in the manufacture of the FDC may be employed for the debris filter box. Stainless steel and cast iron, are primary choices, while an option may be certain tough plastics such as polycarbonate, if a method of ensuring a tight fit to the two tubes that are in fluid communication therewith, can be had and still maintain required pressure flows. If cast iron is employed the use of the interior epoxy or other coating discussed elsewhere herein becomes more important. As to size of the box, an elevation of about 4.5 inches is preferred, and the width will vary according to the width of the down tube to which it leads. A width of down tube diameter+2 inches is suggested. Thus a 4-inch down tube has a 6-inch wide box, and a 10-inch down tube would have a 12-inch wide debris filter box. The depth is always greater than the down tube diameter as can be seen in the figures.

While the debris filter box is primarily intended for inclusion in or for addition to a fire department connection, it is also seen that the debris filter box can be installed in-line in any fluid line where the possibility of the undesired introduction of solid items, either intentionally or unintentionally, can transpire. Mention can be made of canneries where stray food pieces can obstruct a flow line, or farm and ranch water delivery systems such as to cattle.

As mentioned previously, the debris filter box is preferably set at about a 30-degree angle in a fire department connection. The debris box may be disposed at anywhere within the range of fifteen to forty-five degrees relative to the horizontal ground for FDCs having a vertical down tube. The reasoning is, that if placed at a 90-degree angle or generally horizontal, debris in box would not fall forward toward the front cover plate under the rush of water coming down in the debris box. The inclined installation, permits the water to push the debris forward and thus off the filter media screen(s) to ensure smooth fluid flow as is desired.

But in other fluid flow installations, such as shown in FIG. 19, gravity comes into play, such that debris falls away from the filter media toward the cover plate. Thus the debris box unit may be placed in a vertical flow line at a 90-degree angle when the water entering therein is a horizontal flow.

The invention of the improved FDC is made by the interconnection of parts. Whether a tube or other member employed herein has a male thread or a female thread, is of no consequence, just so long as a mating engagement takes place between the two parts that are to be joined together.

Cleanout

Neither firefighters, nor building maintenance people can visibly determine whether an FDC is clogged with debris due to vandalism. But at least with the presence of the debris filter box of this invention, clogging of the sprinkler system lines is highly reduced due to the operation of the box as described above. Since the debris filter box can segregate out even small items, the necessity to reverse flush the sprinkler system to remove debris is obviated. The firefighter or maintenance person will use a wrench to remove the bolts that hold the front plate to the box, remove the removable screen and replace it if damaged, wipe out any sticky or soft stuff such as newspaper that may be present as well as any particulates if resent. Once this task is completed, he will reinstall the front cover plate, all within a bout a five minute time frame. This should be done periodically to ensure a smooth operating sprinkler system.

Since certain changes may be made in the described apparatus without departing from the scope of the invention herein involved, it is intended that all matter contained in the above description and shown in the accompanying drawings shall be interpreted as illustrative and not in a limiting sense.

I claim:

1. A fire department connection with debris filter comprising:
   at least one pipe fitting;
   at least one upper pipe that is a pipe or a tube;
   a downward flow debris filter; and
   a lower pipe that is a pipe or a tube, wherein,
   said at least one pipe fitting: functions to fluidly connect to another pipe fitting on a fire hose, is located at the upper frontward portion of said fire department connection with debris filter, and is fluidly coupled to said at least one upper pipe,
   said at least one upper pipe is fluidly connected at one end to said at least one pipe fitting and at its other end to said downward flow debris filter, at an upper surface of said downward flow debris filter,
   said lower pipe is fluidly connected at its lower end to the fire protection system of the building and at its upper end to a bottom surface of said downward flow debris filter, and
   said downward flow debris filter is:
   rectangular prism-shaped on its front half and circular prism-shaped on its back half, where the diameter of the circular prism is essentially the same as the width of the rectangular prism to allow the sides of the rectangular prism to form a smooth seamless connection with the sides of the circular prism to yield a complete enclosure with a front surface, a rear surface, a set of two side surfaces, along with said upper surface and said bottom surface, wherein said smooth seamless connection reduces swirling turbulence and debris deposits in the upper portion of said downward flow debris filter,
   not positioned horizontally when installed, but rather the profile of said downward flow debris filter is angled at 20-70 degrees from horizontal, where the front of said downward flow debris filter is positioned below the back of said downward flow debris filter, and
   positioned so that fluid flows downward through said upper surface of downward flow debris filter, downward through said a downward flow debris filter, through said bottom surface of said downward flow debris filter, through said lower pipe, and on to the fire protection system of the building.

2. A fire department connection with debris filter as recited in claim 1 wherein said front surface of said downward flow debris filter is reversibly attachable to the rest of said downward flow debris filter through the use of at least one reversibly attachable fastener.

3. A fire department connection with debris filter as recited in claim 1 further comprising a circular mesh sheet segment affixed to the upper end of said lower pipe.

4. A fire department connection with debris filter as recited in claim 1 wherein the debris filter end of said at least one upper pipe extends downward into the interior of said downward flow debris filter and the upper end of said lower pipe extends upwards into the interior of said downward flow debris filter, such that there exists a gap between said members appropriately sized to accepted by sliding and holding into place, sliding to remove for cleaning, and sliding back into place, in repeated fashion, a removable mesh sheet.

5. A fire department connection with debris filter as recited in claim 4, wherein the extension of said at least one upper pipe located in the interior of said debris filter has an arched cutaway section (67) on its front surface to provide hand-access to said circular mesh sheet or said removable mesh sheet or both.

6. A fire department connection with debris filter as recited in claim 4, wherein said removable mesh sheet has mesh holes sized at $\frac{1}{16}$-$\frac{3}{8}$ of an inch.

* * * * *